United States Patent [19]

Clarke et al.

[11] Patent Number: 6,046,293
[45] Date of Patent: Apr. 4, 2000

[54] SOLID-LIQUID PHASE INTERFACIAL POLYMERIZATION

[75] Inventors: Stephen Ross Clarke, Morphett Vale, Australia; Daniel Graiver, Midland, Mich.; Janis Gunars Matisons, Marion, Australia; Michael James Owen, Midland, Mich.

[73] Assignees: University of South Australia, The Levels, Australia; Dow Corning Corporation, Midland, Mich.

[21] Appl. No.: 09/203,318

[22] Filed: Dec. 1, 1998

[51] Int. Cl.[7] .................................................. C08G 77/06
[52] U.S. Cl. ............................... 528/10; 528/32; 528/33; 528/34; 528/38; 528/43
[58] Field of Search ................................. 528/10, 32, 33, 528/34, 38, 43

[56] References Cited

U.S. PATENT DOCUMENTS

| | | | |
|---|---|---|---|
| 3,481,965 | 12/1969 | Selin | 60/448.2 |
| 5,169,920 | 12/1992 | Okawa | 528/34 |
| 5,629,401 | 5/1997 | Graiver | 528/43 |
| 5,637,668 | 6/1997 | Graiver | 528/33 |
| 5,969,173 | 10/1999 | Clarke et al. | 556/449 |

*Primary Examiner*—Robert Dawson
*Assistant Examiner*—Jeffrey B. Robertson
*Attorney, Agent, or Firm*—James L. De Cesare

[57] ABSTRACT

A process for manufacturing high molecular weight, alternating polysiloxane copolymers, by solid-liquid phase, nonaqueous, interfacial polymerization. The copolymers consist of alternating siloxane repeating units of the $(AB)_m$ type, such as diphenylsiloxane units and dimethylsiloxane units, alternately polymerized together to form the copolymer. The solid-liquid phase interfacial polymerization process is fast, proceeds smoothly at room temperature, and is not reversible, i.e., no cyclic siloxane species are generated. The resulting polysiloxanes can be formed into thermoplastic elastomers which are suitable for use as sealants, fillers, and films.

9 Claims, No Drawings

SOLID-LIQUID PHASE INTERFACIAL POLYMERIZATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is directed to silicone polymers and copolymers prepared by a nonaqueous, solid-liquid phase interfacial polymerization process, wherein polycondensation occurs at an interface between reactive starting materials. One of the starting materials is dissolved in a solvent, but the other starting material is a solvent-free, reactive, solid material.

BACKGROUND OF THE INVENTION

Solid-liquid phase interfacial polymerization processes are closely related to liquid-liquid phase interfacial polymerization processes, and both techniques have been used to produce polycondensation polymers. The conventional liquid-liquid phase interfacial polymerization process is a polycondensation reaction wherein monomers are dissolved in mutually immiscible solvents. Polymerization occurs when the monomer in one phase diffuses from the bulk of the solution into the interface, and reacts with the monomer in the other phase.

A solid-liquid phase interfacial polymerization process is slightly different, however, but achieves similar results. Thus, the solid-liquid phase process involves a polymerization reaction wherein one monomer is dissolved in a solvent to form a liquid phase. However, the other phase is not liquid, but rather a solid, and the polycondensation reaction occurs at the liquid phase-solid phase interface.

As is true for liquid-liquid phase interfacial polymerization, solid-liquid phase polymerization rates depend upon the diffusion rate and the reactivity of functional groups on the monomers. The particle size of the solid phase monomer can also influence overall polymerization rates.

One example of known solid-liquid phase interfacial polymerization processes is the synthesis of polycarbonate polymers, which involves the reaction of potassium carbonate as the solid phase monomer, and dibromo-p-xylene dissolved in a solvent, as the liquid phase. This reaction has been variously described in the literature, including the Journal of Polymer Science, Polymer Chemistry Edition, Volume 17, Page 517, (1979); Polymer Preprints, American Chemical Society, Division of Polymer Chemistry, Volume 22, No. 2, Page 387, (1981); and Polymer Preprints, American Chemical Society, Division of Polymer Chemistry, Volume 23, No. 2, Page 174, (1982).

Among the conventional liquid-liquid phase interfacial polymerization reactions are the polycondensation of diamines with a diacetyl chloride to form nylon, i.e., polyamides; and the reaction of alcohols with acids to form polyesters. Interfacial polymerization processes in the organic realm typically provide advantages such as faster polymerization rates than other types of polymerization reactions such as bulk or solution polymerization. Even more important, however, is the fact that because stoichiometry between monomers need not be precise, a higher molecular weight polymer can be obtained by these methods. This is particularly important in organic polycondensation reactions where an imbalance of a fraction of a percent can cause the extent of polymerization to be greatly affected.

Another advantage of the interfacial polymerization process is that it can result in the formation of high molecular weight polymers at an interface, regardless of the overall percent conversion of bulk amounts of the two or more monomeric reactants remaining in the solution.

Further advantages offered by interfacial polymerization reactions in the synthesis of organic polymers include (i) the ability to prepare infusible polymers; (ii) the ability to synthesize polymers with chemically active substituents as well as heteroatoms; (iii) the ability to control the crosslinking of the polymer structure; (iv) the ability to use cis- and trans-conformation without rearrangement; (v) the ability to prepare optically active polymers without decomposition of intermediates; (vi) the ability to use short-chain and/or substituted ring intermediates; (vii) the ability to use thermally unstable intermediates to form thermally stable polymers; (vii) the ability to form block and ordered copolymeric structures; (ix) the ability to form synthetic elastomers; (x) it offers a direct method of forming polymer solutions and dispersions; (xi) it provides a direct method for the polymerization and formation of polymer coatings and encapsulants; and (xii) it is a direct method for polymerization of monomers into fibrous particulates, fibers, and films.

A significant additional advantage of a solid-liquid phase, interfacial polymerization process involving a silicon atom containing monomer, is the ability to control the structure of the resulting polymer chain and the composition of the resulting copolymers, without requiring the use of a catalyst, and without the usual problems associated with various rearrangements which occur during such equilibrium polymerization processes.

Accordingly, and with respect to the present invention, a non-aqueous, solid-liquid phase interfacial polymerization process can be carried out by using a dihaloorganosilane or a dihaloorganosiloxane dissolved in solvent to form the liquid phase. A solventless, solid, alkali metal silanolate or an alkali metal siloxanolate, is used as the other phase. High molecular weight polysiloxanes and alkali metal chloride salts are formed at the solid-liquid interface.

When a dihaloorganosilane is used as the liquid phase, or when an alkali metal silanolate is used as the solid phase in the reaction, then a single silicon atom containing repeating unit will form. When a dihaloorganosiloxane is used as the liquid phase, or when an alkali metal siloxanolate is used as the solid phase in the reaction, then a multi-silicon atom containing repeating unit will form, e.g., a trisiloxane repeating unit.

Since the inorganic salt by-product of the reaction, i.e., the alkali metal chloride, is not soluble in the organic solvent phase, it separates from the solution, and hence does not interfere with the polycondensation reaction. If the polymer is insoluble in the solvent phase, it also phase separates from the reaction zone. The separated polymer and inorganic salt can then be washed several times with distilled or deionized water, to remove the inorganic salt and any unreacted silanolate or siloxanolate salts. If the polymer is soluble in the organic solvent phase, it can be removed by any suitable extraction procedure, such as filtration and evaporation of solvent, or by polymer precipitation via addition of an incompatible solvent. Washing of the resulting polymer with distilled water removes any residual inorganic salt and any unreacted silanolate or siloxanolate salt.

BRIEF SUMMARY OF THE INVENTION

The invention relates to a method of making alternating siloxane block copolymers by (A) reacting (i) a nonaqueous, organic solvent solution of a dihaloorganosilane or an alpha, omega-dihaloorganosiloxane, i.e., $\alpha,\omega$-dihaloorganosiloxane, at an interface formed with (ii) a solvent-free, immiscible, nonaqueous, solid phase based on an alkali metal silanolate of the formula $R_xSi(OM)_{4-x}$ or an alkali metal siloxanolate of the formula $MO(R_2SiO)_nM$, wherein R is an alkyl radical of 1–6 carbon atoms, an aryl radical, an alkenyl radical, or an alkylamino radical; x is 0–3; n is 2–20; M is an alkali metal in Group IA of the Periodic Table; and (B) recovering an alternating siloxane block copolymer from the interface.

In one embodiment, a monohaloorganosilane can be included in the liquid phase to function as a chain stopper, if it is desired to modify the molecular chain length of the polymer, or if it is desired to modify the type of end group on the polymer chain. Some suitable monohaloorganosilanes which can be used to perform these functions are trimethylchlorosilane, trimethylbromosilane, trimethylfluorosilane, trimethyliodosilane, triethylchlorosilane, triethylbromosilane, tri-n-propylchlorosilane, triphenylchlorosilane, and triphenylfluorosilane.

In another embodiment, a trihaloorganosilane or a tetrahalosilane can be included in the liquid phase, if it is desired to produce a crosslinked polymer structure. Some suitable trihaloorganosilanes and tetrahalosilanes which can be used to perform this function are methyltrichlorosilane, methyltrifluorosilane, tetrachlorosilane, tetrabromosilane, tetrafluorosilane, and tetraiodosilane.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

According to the method of the present invention, the interfacial polymerization of organosilicon monomer reactants provides structures and combinations of structures which cannot be readily obtained by other known commercial routes. One example of such a structure is a well-defined dimethylsiloxane-co-diphenylsiloxane alternating copolymer.

Copolymers of such a structure, according to this invention, typically contain alternating sequences of a comonomer "A" joined to a comonomer "B". As used herein, the term "alternating copolymer" is intended to mean a material containing a sequence distribution represented by $(AB)_m$, i.e., —ABABABAB—, where A is a dimethylsiloxane unit, and B is a diphenylsiloxane unit.

For purpose of illustration, these difunctional "D" units are shown below:

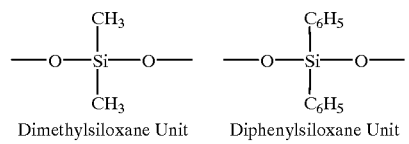

Dimethylsiloxane Unit    Diphenylsiloxane Unit

When these types of "D" units are combined, they result in the formation of a suitably terminated alternating siloxane copolymer structure as generally depicted below:

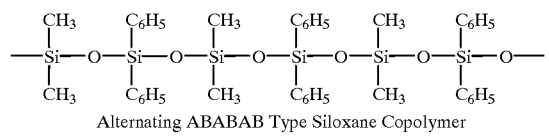

Alternating ABABAB Type Siloxane Copolymer

Another example of a copolymer according to the invention is a poly(dimethylsiloxane-co-trimethytriphenyltrisiloxane) copolymer of the type —$(AB_3)_m$— where A is used to represent the dimethylsiloxane unit originating from the dipotassium dimethylsilanolate monomer used in the reaction, and where B is used to represent the methylphenylsiloxane unit which originates from the dichlorotrimethyltriphenyl trisiloxane monomer used in the reaction.

For purpose of illustration, these difunctional "D" units are shown below:

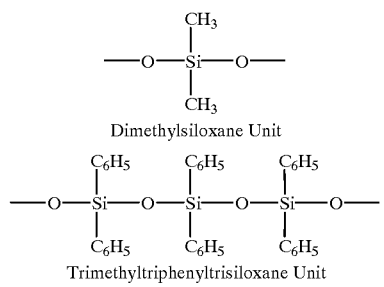

Dimethylsiloxane Unit

Trimethyltriphenyltrisiloxane Unit

When these types of "D" units are combined, they result in the formation of a suitably terminated siloxane copolymer as generally depicted below:

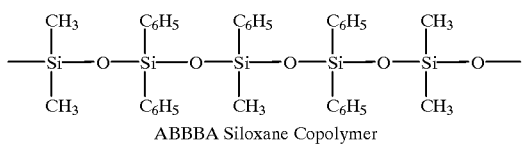

ABBBA Siloxane Copolymer

It should be pointed out that a major difference exists between the solid-liquid phase interfacial polymerization of organosilicon reactants according to this invention, when compared to prior methods. The difference involves the presence of water as a solvent. Although water has been used in many organic systems, no water is used in the interfacial polymerization method according to this invention. This is for the reason that the use of water in the polycondensation of organosilicon monomers is detrimental and leads to a low molecular weight, as well as a complete loss of control over the polymer structure, due to rearrangement and re-equilibration of the polymer in the presence of any residual soluble acid or base. Thus, water is detrimental where an acid or base is formed, leading to rearrangement and equilibrium polymerization, i.e., the formation of cyclic siloxane species. Further, the presence of water or an excess of water can lead to low molecular weight silanol terminated end products.

Another significant difference between the present method and prior methods is the fact that even if water were to be present, organosilicon monomers such as those used in this invention would inherently react with themselves; whereas in prior methods in the synthesis of organic polymers, the water soluble organic reactants are stable in the aqueous solution, and therefore would react only across the interface.

While U.S. Pat. No. 5,629,401 (May 13, 1997) and U.S. Pat. No. 5,637,668 (Jun. 10, 1997) disclose non-aqueous interfacial polymerization processes for the formation of alternating siloxane block polymers, the process in the '401 and '668 patents is a liquid-liquid phase process. The method according to the present invention is significantly different to such liquid-liquid phase processes because (i) a liquid phase/solid phase process is used; (ii) the alkali metal silanolates and the alkali metal siloxanolates which are used are insoluble in organic solvents, and therefore can be more effectively used as a reactive monomer; and (iii) alternating siloxane polymers containing single siloxane units, i.e., —ABABABAB—, can now be prepared using an interfacial polymerization process. Liquid-liquid phase interfacial polymerization processes as described in the '401 and '668 patents, in contrast, result in siloxane polymers containing multiple units, i.e., —BBBABBBABBBABBBA— and —BBBAABBBAABBBAABBBAA—, respectively.

In the method according to this invention, one component of the reaction is a dihaloorganosilane or an α,ω-dihaloorganosiloxane. This component is dissolved in a solvent such as anhydrous hexane and functions as the liquid phase. The other component of the reaction is a solid alkali metal silanolate, or a solid alkali metal siloxanolate, which functions as the solid phase. The reaction occurs at the interface of the liquid phase and the solid phase.

The component of the solid phase can be an alkali-metal silanolate having the formula $R_xSi(OM)_{4-x}$ or an alkali metal siloxanolate of the formula $MO(R_2SiO)_nM$. In these formulas, R represents an alkyl radical of 1–6 carbon atoms, an aryl radical, an alkenyl radical, or an alkylamino radical; x is 0–3; and n is 2–20.

Some examples of suitable alkyl and aryl radicals R are methyl, ethyl, and phenyl. Some examples of suitable alkenyl radicals R are vinyl, allyl, propenyl, and hexenyl. Some examples of suitable aminoalkyl radicals R are aminopropyl and ethylene diaminopropyl. M represents an alkali metal in Group IA of the Periodic Table such as lithium, sodium, potassium, rubidium, and cesium. Sodium and potassium are the preferred alkali metals, however.

Generally, it has been found that as the value of n increases, so does the likelihood of alkali metal siloxanolates being soluble in organic solvents, hence the preference herein is for the use of alkali metal silanolates. Where it is desired to employ an alkali metal siloxanolate, however, the value of n is preferably selected to be in the range of about 2–10, most preferably in the range of about 3–6.

Examples of some suitable alkali metal silanolates and alkali metal siloxanolates are disodium diphenylsilanolate $(C_6H_5)_2Si(ONa)_2$, disodium dimethylsilanolate $(CH_3)_2Si(ONa)_2$, disodium methylaminopropylsilanolate $(CH_3)[H_2NCH_2CH_2CH_2]Si(ONa)_2$, their potassium equivalents, dipotassium dimethylsilanolate $KO[(CH_3)_2SiO]K$, dipotassium dimethylsiloxanolate $KO[(CH_3)_2SiO]_nK$ where n is 4–8, dipotassium phenylmethylsilanolate $KO[(C_6H_5)(CH_3)SiO]K$, and dipotassium phenylmethylsiloxanolate $KO[(C_6H_5)(CH_3)SiO]_nK$ where n is 4–8.

Such alkali metal silanolates and alkali metal siloxanolates can be obtained by various methods known in the art, and several processes for their preparation are set forth in detail in U.S. Pat. No. 5,629,401 (May 13, 1997) and U.S. Pat. No. 5,637,668 (Jun. 10, 1997), incorporated herein by reference.

Representative of some suitable organodihalosilanes which can be used as the component of the liquid phase include organodichlorosilanes such as 2-acetoxyethylmethyldichlorosilane, 3-acetoxypropylmethyldichlorosilane, allylmethyldichlorosilane, amyldichlorosilane, amylmethyldichlorosilane, 5-(bicycloheptenyl)methyldichlorosilane, 2-(bicycloheptyl)methyldichlorosilane, bis-(3-chloropropyl)dichlorosilane, bis(3-cyanopropyl)dichlorosilane, 4-butenyldichloromethylsilane, 2-(carbomethoxy)ethylmethyldichlorosilane, 2-chloroethylmethyldichlorosilane, chloromethylmethyldichlorosilane, chlorophenylmethyldichlorosilane, 3-chloropropyldichlorosilane, 3-chloropropylhexyldichlorosilane, 3-chloropropylmethyldichlorosilane, 2-cyanoethylmethyldichlorosilane, 3-cyanopropylmethyldichlorosilane, [2-(3-cyclohexenyl)ethyl]methyldichlorosilane, cyclohexyldichlorosilane, cyclopentamethylenedichlorosilane, cyclopentyldichlorosilane, cyclotetramethylenedichlorosilane, cyclotrimethylenedichlorosilane, n-decylmethyldichlorosilane, diamyldichlorosilane, di-n-butyldichlorosilane, di-t-butyldichlorosilane, (dichloromethyl)methyldichlorosilane, dichlorosilane, dicyclohexyldichlorosilane, diethyldichlorosilane, di-n-hexyldichlorosilane, dimesityldichlorosilane, dimethyldichlorosilane, dioctyldichlorosilane, diphenyldichlorosilane, di-n-propyldichlorosilane, n-docosylmethyldichlorosilane, ethyldichlorosilane, ethylmethyldichlorosilane, n-heptylmethyldichlorosilane, hexadecyldichlorosilane, hexyldichlorosilane, n-hexylmethyldichlorosilane, isobutyldichlorosilane, 3-methacryloxypropylmethyldichlorosilane, 3-(4-methoxyphenyl)propylmethyldichlorosilane, methylcyclohexyldichlorosilane, methyldichlorosilane, methyldodecyldichlorosilane, methylisopropyldichlorosilane, methyl-n-octadecyldichlorosilane, methyl-n-octyldichlorosilane, (p-methylphenethyl)methyldichlorosilane, methyl(2-phenethyl)dichlorosilane, methylphenyldichlorosilane, methyl-n-propyldichlorosilane, phenylallyldichlorosilane, phenyl(3-chloropropyl)dichlorosilane, phenyldichlorosilane, phenylethyldichlorosilane, phenylvinyldichlorosilane, 1-propyl(3-chloropropyl)dichlorosilane, n-propyldichlorosilane, p-tolylmethyldichlorosilane, (3,3,3-trifluoropropyl)methyldichlorosilane, vinylethyldichlorosilane, vinylmethyldichlorosilane, vinyldichlorosilane, allyldichlorosilane, divinyldichlorosilane, diallyldichlorosilane, and vinylallyldichlorosilane.

Some examples of α,ω-dihaloorganosiloxanes usable herein as the component of the liquid phase include 1,3-bis(chloromethyl)-1,1,3,3-tetramethyldisiloxane,
1,3-bis(3-chloropropyl)-1,1,3,3-tetramethyldisiloxane,
1,3-dichloro-1,3-dimethyl-1,3-diphenyldisiloxane,
1,3-dichlorotetraisopropyldisiloxane,
1,3-dichlorotetramethyldisiloxane,
1,3-dichlorotetraphenyldisiloxane,
1,5-dichlorohexamethyltrisiloxane, and
1,7-dichlorooctamethyltetrasiloxane.

The preferred component of the solid phase, as noted above, is an alkali metal silanolate, and more particularly, dipotassium dimethylsilanolate. This well-defined salt is shown below:

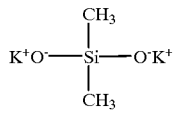

Dipotassium dimethylsilanolate is preferred because it allows preparation of copolymers with dimethylsiloxane units alternating with either single siloxane units or siloxane blocks.

This, however, does not preclude the use of other alkali metal silanolates and alkali metal siloxanolates, provided that the material meets the requirements of the invention, i.e., a solid form which is insoluble in the organic solvent of the liquid phase.

One example of a suitable alkali metal organosiloxanolate which can be used is a dipotassium dimethylsiloxanolate salt corresponding to the formula shown below, in which n is preferably about 4 to about 8.

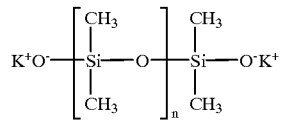

Relative to the solvent, there are several criteria for establishing suitability of a solvent for use as the liquid phase according to this invention. First, the solvent must be capable of dissolving the dihalosilane or the dihalosiloxane. Second, the solvent must be anhydrous, as the presence of any water allows the dissolved monomer to hydrolyze, forming the corresponding disilanol or dihydroxysiloxane, which in turn, self-condense to form unwanted polysiloxanes in this side reaction. Third, the solvent must be a poor solvent for the solid alkali metal silanolate or the alkali metal siloxanolate used as the solid phase. Fourth, it is beneficial, although not essential, that the resulting polymer be insoluble in the solvent, as this facilitates its simple removal. Fifth, the solvent should be one which will not undergo any competing side reactions with any of the reactive monomers or with the resulting polymer.

Non-polar solvents such as hydrocarbons have been found to meet these requirements. The most preferred solvent is anhydrous hexane, although other anhydrous hydrocarbon solvents can be used, some examples of which are benzene; decane; dodecane; ethylbenzene; heptane; hexadecane; 2-methylbutane; nonane; octane; 2,2-dimethylbutane; 2,2,4-trimethylpentane; and pentane.

In general, the reactions of organohalosilanes or organohalosiloxanes with alkali metal silanolates or alkali metal siloxanolates, according to the present invention, proceed according to the scheme:

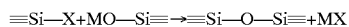

wherein M is a Group IA metal such as Na or K, and X is halogen. For example, when M is Na and X is Cl, the reaction scheme is:

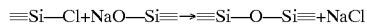

Such reactions when carried out by methods according to this invention can be conducted with slow speed stirring, using a magnetic stirrer bar, and at room temperature, i.e., about 10–45° C. Typically, the solid-liquid phase interfacial polymerization reaction is carried out by adding an alkali metal silanolate or an alkali metal siloxanolate solid in powder or granular form, to a solvent solution of the haloorganosilane or the haloorganosiloxane. The mixture is allowed to stand at room temperature for about 24 hours with slow speed stirring. It is generally preferred to carry out the procedure in a vacuum atmosphere or equivalent work station using argon, or by using an inert gas-high vacuum technique.

Removal of the polymer formed at the interface is relatively simple if the polymer has sufficient cohesive physical integrity or simply precipitates from the interface as a solid material. In that case, it can be pulled out at the interface, removed as a solid sediment, or filtered from the reaction mixture. Removal of the polymer becomes more difficult if the polymer is a viscous liquid, a low modulus solid, or dissolves into the organic solvent liquid phase.

For example, when excess dipotassium dimethylsilanolate was reacted with diphenyldichlorosilane dissolved in anhydrous hexane, a white solid material precipitated at the bottom of the reaction vessel. The total mass of the material was weighed, and found to equal that of the starting components. The material was washed with deionised water to remove any co-precipitated KCl. A potassium silanolate end-terminated, alternating copolymer was isolated in the form of a soft white powder.

A second reaction was carried out, similar to the above, but including a small amount of trimethylchlorosilane, which was added to the liquid phase to function as a chain stopper. This modification produced a polymer of lower molecular weight, but it was end-capped with trimethylsiloxane units. Again, a white solid material precipitated at the bottom of the reaction vessel, and its total mass when weighed, equaled that of the starting components. The material was washed with deionised water to remove co-precipitated KCl, and a slightly sticky, soft white powder form of an alternating siloxane copolymer was isolated.

EXAMPLES

The following examples illustrate the use of dipotassium dimethylsilanolate in an interfacial reaction with chlorosilanes to produce such alternating $(AB)_m$ type siloxane copolymers.

Example 1

Hexane was distilled, dried over anhydrous sodium sulfate prior to its use, and then transferred into a vacuum atmosphere work station operated under a purified argon atmosphere. Moisture in the work station was restricted to less than 50 ppm. Following this, 0.3028 gram (0.00120 mole) of diphenyldichlorosilane was dissolved in 5.070 gram of anhydrous hexane to produce a liquid phase. Dipotassium dimethylsilanolate (0.3735 gram, 0.00222 mole) in powder form was added to the reaction mix, and gently stirred using a magnetic stirring bar at room temperature for 24 hours. The reaction vessel was sealed immediately after addition of dipotassium dimethylsilanolate to prevent loss of hexane into the work station. The precipitated material was filtered, washed in toluene, and then dried to obtain a yield of 0.536 gram. The material was washed with deionised water to remove co-precipitated KCl, and dried to obtain a siloxane copolymer with a yield of 0.188 gram which was 58% of the theoretical yield.

Formation of the siloxane copolymer was confirmed by Fourier-Transform Infrared (FT-IR) spectroscopy using a diffuse reflectance infrared technique (DRIFT). Infrared analysis showed a typical siloxane bond at 1000–1200 cm$^{-1}$; silicon-dimethyl absorption was observed at 803 cm$^{-1}$, and the characteristic silicon-methyl absorption was observed at 1266 cm$^{-1}$. In addition, peaks at 2912, 2966 and 2851 cm$^{-1}$, which are typical of aliphatic C—H absorptions, were observed. Silicon-phenyl absorptions were observed at 1428 cm$^{-1}$ and 1146 cm$^{-1}$. In addition, typical aromatic C—H absorptions were noted at 3026, 3046 and 3066 cm$^{-1}$. A distinctive series of combination and overtone bands were found at 1972, 1898, 1830 and 1777 cm$^{-1}$, which is typical of polymers containing phenyl groups attached to a backbone chain. This characteristic is also observed in the same region for common organic polymers such as polystyrene.

Differential Thermogravimetric Analysis (TGA) was carried out on a 1.2 milligram sample of material at a heating rate of 5° C./minute to 600° C., under a nitrogen atmosphere at a flow rate of 50 ml/minute. The onset and the end of degradation points were found to occur at 310 and 379° C., and the maximum rate of degradation was found to occur at 357° C.

Differential Scanning Calorimetry (DSC) was also carried out on a 7.5 milligram sample of the material. A thermal history was imparted to the sample, and a number of endothermic crystalline melting points at 50, 112, 169 and 224° C. were observed by simply heating the material at a rate of 5° C./minute from room temperature. The thermal history was achieved by cooling to –120° C., then heating to 260° C., and then cooling to –120° C. at a constant ramp rate of 5° C./minute. On reheating at 5° C. to 260° C., a small glass transition was observed at 10.7° C., with the onset at 3.5° C. and the end at 14.0° C. A single, sharp, clean endothermic crystalline melt was observed at 175° C., with an onset point at 162° C. On cooling at a rate of 5° C./minute, a single, very sharp, clean exothermic crystallization was observed at 123° C., with an onset point of 127° C. It was not possible to find evidence of cold re-crystallization during a heating rate of 5° C./minute from –120° C. to 260° C., after quench cooling at 40° C./minute from the melt.

X-ray diffraction (XRD) analysis of the polymer sample revealed an intense sharp peak at 9° with a base width of 3°; a second broad peak of medium intensity at 20° with a base width of 9°; and a third low intensity peak at 31° with a base width of 4°. Small peaks were also observed at 11°, 13°, 14°, 25°, 27.5°, and 28°.

The DSC and XRD analysis confirmed that the sample contained a significant level of crystallinity and an ordered type of structure.

Example II

Hexane was distilled, dried over anhydrous sodium sulfate prior to its use, and then transferred into a vacuum atmosphere work station operating under a purified argon atmosphere. Moisture was restricted to less than 50 ppm in the work station. Following this, 0.3178 gram (0.00126 mole) of diphenyldichlorosilane was dissolved in 4,997 grams of anhydrous hexane. There was added 0.1175 gram of an end-capping premix consisting of 0.0079 gram of trimethylchlorosilane dissolved in 10.027 gram of anhydrous hexane, equivalent to 0.000114 gram/0.00000106 mole of trimethylchlorosilane. Dipotassium dimethylsilanolate (0.3780 gram, 0.00225 mole) in powder form was added to the reaction mix, and gently stirred using a magnetic stirring bar at room temperature for 24 hours. The reaction vessel was sealed immediately after addition of dipotassium dimethylsilanolate to prevent the loss of hexane into the workstation. The precipitated material was filtered and weighed (0.640 gram), washed in toluene, and then dried to obtain a yield of 0.577 gram. The material was washed with deionised water to remove co-precipitated KCl, and dried to obtain a siloxane copolymer with a yield of 0.041 gram, which was 12% of the theoretical yield. Assuming that the reaction went to completion, the number average molecular weight ($M_n$) of the siloxane copolymer was estimated at about 64,000.

Fourier-Transform Infrared (FT-IR) spectroscopy, using the diffuse reflectance infrared technique (DRIFT), confirmed the formation of the polymer. Infrared analysis showed the typical siloxane bond at 1000–1200 cm$^{-1}$; and silicon-dimethyl absorption was observed at 803 cm$^{-1}$, although it was less intense compared to Example I. This indicated a reduction in molecular weight due to the end-capping procedure used in this example. Peaks at 850 and 749 cm$^{-1}$ attributed to trimethyl-silicon absorption, were relatively more intense compared to Example I. This reflected the presence of trimethylsiloxy end capping units in the copolymer according to this example. The characteristic silicon-methyl absorption was observed at 1266 cm$^{-1}$, and peaks at 2912, 2966 and 2851 cm$^{-1}$ typical of aliphatic C—H absorptions, were also observed. Silicon-phenyl absorptions were observed at 1434 cm$^{-1}$ and 1146 cm$^{-1}$. In addition, typical aromatic C—H absorptions were noted at 3019, 3053 and 3073 cm$^1$. A series of combination and overtone bands for mono-substituted aromatic groups was also found at 1965, 1904, 1824 and 1777 cm$^{-1}$.

Differential Thermogravimetric analysis (TGA) was carried out on a 1.5 milligram sample of the material at a heating rate of 5° C./minute to 600° C., under a nitrogen atmosphere at a flow rate of 50 ml/minute. The onset and the end of degradation points were found to occur at 311 and 391° C., and the maximum rate of degradation was found to occur at 368° C. This improvement in the temperature stability of the material prepared according to this example, compared to the material prepared in Example I, was attributed to the end-capping procedure.

Differential Scanning Calorimetry (DSC) was carried out on a 7.2 milligram sample of the material. A thermal history was imparted to the sample, and a number of endothermic crystalline melting points at 74, 116, 142, 179 and 217° C., were observed, by simply heating the sample at a rate of 5° C./minute from room temperature. The thermal history was achieved by cooling the sample to –120° C., heating it to 260° C., and then cooling it to –120° C. at a constant ramp rate of 5° C./minute. On reheating at 5° C. to 260° C., a glass transition was observed at 5.6° C., with the onset at 3.4° C. and the end at 9.6° C. An endothermic crystalline melt was observed at 172° C. with an onset point at 155° C. Shoulders on the peak were also observed at about 126 and 149° C., suggesting that the polymer prepared according to this example was less consistent than the polymer prepared in Example I. On cooling at a rate of 5° C./minute, an endothermic crystallization peak at 110° C. was observed with an onset point of 120° C. It was possible to heat the sample to 260° C., and then rapidly quench cool it to −120° C. at ramp rate of 40° C./minute. On reheating at 5° C. to 260° C., a glass transition was observed at 15° C. An exothermic cold recrystallization peak occurred during the heat cycle, at 71.0° C. with an onset temperature of 56° C. This was followed by an endothermic crystalline melt at 172° C. with an onset point at 155° C. The enthalpy of melting was five times greater than the enthalpy of cold recrystallization. This indicated that there was a significant increase in the amount of amorphous polymer produced in this example, compared to the amount of amorphous polymer in the material of Example 1.

Other variations may be made in compounds, compositions, and methods described herein without departing from the essential features of the invention. The embodiments of the invention specifically illustrated herein are exemplary only and not intended as limitations on their scope except as defined in the appended claims.

We claim:

1. A method of making an alternating siloxane copolymer comprising (A) reacting (i) a non-aqueous organic solvent solution as a liquid phase containing a dihaloorganosilane or an α,ω-dihaloorganosiloxane, at or near an interface formed by the nonaqueous organic solvent solution, and (ii) a solvent-free, immiscible, non-aqueous, solid phase containing an alkali metal silanolate of the formula $R_xSi(OM)_{4-x}$ or an alkali metal siloxanolate of the formula $MO(R_2SiO)_nM$, wherein R is an alkyl radical of 1–6 carbon atoms, an aryl radical, an alkenyl radical, or an alkylamino radical; x is 0–3; n is 2–20; M is an alkali metal in Group IA of the Periodic Table; and (B) recovering the alternating siloxane copolymer.

2. A method according to claim 1 in which the organic solvent used to prepare the liquid phase is anhydrous, and is selected from the group consisting of hexane; benzene; decane; dodecane; ethylbenzene; heptane; hexadecane; 2-methylbutane; nonane; octane; 2,2-dimethylbutane; 2,2,4-trimethylpentane; and pentane.

3. A method according to claim 1 in which the liquid phase contains a dihaloorganosilane selected from the group consisting of 2-acetoxyethylmethyldichlorosilane, 3-acetoxypropylmethyldichlorosilane, allylmethyldichlorosilane, amyldichlorosilane, amylmethyldichlorosilane, 5-(bicycloheptenyl) methyldichlorosilane, 2-(bicycloheptyl) methyldichlorosilane, bis-(3-chloropropyl) dichlorosilane, bis(3-cyanopropyl)dichlorosilane, 4-butenyldichloromethylsilane, 2-(carbomethoxy) ethylmethyldichlorosilane, 2-chloroethylmethyldichlorosilane, chloromethylmethyldichlorosilane, chlorophenylmethyldichlorosilane, 3-chloropropyldichlorosilane, 3-chloropropylhexyldichlorosilane, 3-chloropropylmethyldichlorosilane, 2-cyanoethylmethyldichlorosilane, 3-cyanopropylmethyldichlorosilane, [2-(3-cyclohexenyl)ethyl]methyldichlorosilane, cyclohexyldichlorosilane, cyclopentamethylenedichlorosilane, cyclopentyldichlorosilane, cyclotetramethylenedichlorosilane, cyclotrimethylenedichlorosilane, n-decylmethyldichlorosilane, diamyldichlorosilane, di-n-butyldichlorosilane, di-t-butyldichlorosilane, (dichloromethyl)methyldichlorosilane, dichlorosilane, dicyclohexyldichlorosilane, diethyldichlorosilane, di-n-hexyldichlorosilane, dimesityldichlorosilane, dimethyldichlorosilane, dioctyldichlorosilane, diphenyldichlorosilane, di-n-propyldichlorosilane, n-docosylmethyldichlorosilane, ethyldichlorosilane, ethylmethyldichlorosilane, n-heptylmethyldichlorosilane, hexadecyldichlorosilane, hexyldichlorosilane, n-hexylmethyldichlorosilane, isobutyldichlorosilane, 3-methacryloxypropylmethyldichlorosilane, 3-(4-methoxyphenyl)propylmethyldichlorosilane, methylcyclohexyldichlorosilane, methyldichlorosilane, methyldodecyldichlorosilane, methylisopropyldichlorosilane, methyl-n-octadecyldichlorosilane, methyl-n-octyldichlorosilane, (p-methylphenethyl)methyldichlorosilane, methyl(2-phenethyl)dichlorosilane, methylphenyldichlorosilane, methyl-n-propyldichlorosilane, phenylallyldichlorosilane, phenyl(3-chloropropyl) dichlorosilane, phenyldichlorosilane, phenylethyldichlorosilane, phenylvinyldichlorosilane, 1-propyl(3-chloropropyl)dichlorosilane, n-propyldichlorosilane, p-tolylmethyldichlorosilane, (3,3,3-trifluoropropyl)methyldichlorosilane, vinylethyldichlorosilane, vinylmethyldichlorosilane, vinyldichlorosilane, allyldichlorosilane, divinyldichlorosilane, diallyldichlorosilane, and vinylallyldichlorosilane.

4. A method according to claim 1 in which the liquid phase contains an α,ω-dihaloorganosiloxane selected from the group consisting of 1,3-bis(chloromethyl)-1,1,3,3-tetramethyldisiloxane,
1,3-bis(3-chloropropyl)-1,1,3,3-tetramethyldisiloxane,
1,3-dichloro-1,3-dimethyl-1,3-diphenyldisiloxane,
1,3-dichlorotetraisopropyldisiloxane,
1,3-dichlorotetramethyldisiloxane,
1,3-dichlorotetraphenyldisiloxane,
1,5-dichlorohexamethyltrisiloxane, and
1,7-dichlorooctamethyltetrasiloxane.

5. A method according to claim 1 in which the solid phase contains an alkali metal silanolate or an alkali metal siloxanolate selected from the group consisting of disodium diphenylsilanolate $(C_6H_5)_2Si(ONa)_2$, disodium dimethylsilanolate $(CH_3)_2Si(ONa)_2$, disodium methylaminopropylsilanolate $(CH_3)[H_2NCH_2CH_2CH_2]Si(ONa)_2$, their potassium equivalents, dipotassium dimethylsilanolate $KO[(CH_3)_2SiO]K$, dipotassium dimethylsiloxanolate $KO[(CH_3)_2SiO]_nK$ where n is 4–8, dipotassium phenylmethylsilanolate $KO[(C_6H_5)(CH_3)SiO]K$, and dipotassium phenylmethylsiloxanolate $KO[(C_6H_5)(CH_3)SiO]_nK$ where n is 4–8.

6. A method according to claim 1 in which the liquid phase includes, in addition to the dihaloorganosilane or the α,ω-dihaloorganosiloxane, (i) a monohaloorganosilane selected from the group consisting of trimethylchlorosilane, trimethylbromosilane, trimethylfluorosilane, trimethyliodosilane, triethylchlorosilane, triethylbromosilane, tri-n-propylchlorosilane, triphenylchlorosilane, and triphenylfluorosilane;

or in which the liquid phase includes, in addition to the dihaloorganosilane or the α,ω-dihaloorganosiloxane, (ii) a trihaloorganosilane or a tetrahalosilane selected from the group consisting of methyltrichlorosilane, methyltrifluorosilane, tetrachlorosilane, tetrabromosilane, tetrafluorosilane, and tetraiodosilane.

7. An alternating siloxane copolymer prepared according to the method defined in claim 1.

8. An alternating siloxane copolymer according to claim 7 containing alternating difunctional $(CH_3)_2SiO_{2/2}$ and $(C_6H_5)_2SiO_{2/2}$ units in a ratio of one to one, respectively.

9. Sealants, fillers, or films prepared from the alternating siloxane copolymer in claim 7.

* * * * *